(12) United States Patent
Moldoveanu et al.

(10) Patent No.: US 11,255,991 B2
(45) Date of Patent: Feb. 22, 2022

(54) MULTI-DIMENSIONAL SEISMIC SENSOR ARRAY

(71) Applicant: WESTERNGECO L.L.C., Houston, TX (US)

(72) Inventors: Nicolae Moldoveanu, Houston, TX (US); Olav Lien, Knarvik (NO); Sudhir Pai, Houston, TX (US); Leendert Combee, Asker (NO)

(73) Assignee: WesternGeco L.L.C., Houston, TX (US)

(*) Notice: Subject to any disclaimer, the term of this patent is extended or adjusted under 35 U.S.C. 154(b) by 56 days.

(21) Appl. No.: 15/112,437

(22) PCT Filed: Jan. 27, 2015

(86) PCT No.: PCT/US2015/013038
§ 371 (c)(1),
(2) Date: Jul. 19, 2016

(87) PCT Pub. No.: WO2015/113031
PCT Pub. Date: Jul. 30, 2015

(65) Prior Publication Data
US 2017/0003408 A1    Jan. 5, 2017

Related U.S. Application Data

(60) Provisional application No. 61/932,066, filed on Jan. 27, 2014, provisional application No. 62/013,482, (Continued)

(51) Int. Cl.
*G01V 1/38*    (2006.01)
*G01V 1/20*    (2006.01)

(52) U.S. Cl.
CPC .............. *G01V 1/20* (2013.01); *G01V 1/3817* (2013.01); *G01V 1/3808* (2013.01);
(Continued)

(58) Field of Classification Search
CPC ...... G01V 1/20; G01V 1/3817; G01V 1/3808; G01V 1/3843; G01V 2001/207; G01V 2210/144
See application file for complete search history.

(56) References Cited

U.S. PATENT DOCUMENTS 3,539,979 A * 11/1970 Crall .................... G10K 11/008
367/20
4,160,229 A *  7/1979 McGough .............. G01V 1/201
367/154
(Continued)

FOREIGN PATENT DOCUMENTS

| CN | 102183789 A | 9/2011 |
| CN | 102511011 A | 6/2012 |
| EP | 2280294 A2 | 2/2011 |

OTHER PUBLICATIONS

Search Report for the equivalent European patent application 15740880.8 dated Nov. 23, 2017.
(Continued)

*Primary Examiner* — Krystine E Breier
(74) *Attorney, Agent, or Firm* — Fletcher Yoder, P.C.

(57) ABSTRACT

A system includes an unmanned marine vessel having a hull; a multi-dimensional seismic sensor array coupled with the hull, wherein the multi-dimensional seismic sensor array is configured to acquire seismic survey data in multiple directions; wherein the unmanned marine vessel comprises a power source configured to drive and provide propulsion to the unmanned marine vessel; and an umbilical cord for coupling the multi-dimensional seismic sensor array with the hull of the unmanned marine vessel, wherein the umbilical provides electrical communication between the unmanned marine vessel and the multi-dimensional seismic sensor array.

17 Claims, 4 Drawing Sheets

Related U.S. Application Data filed on Jun. 17, 2014, provisional application No. 62/021,422, filed on Jul. 7, 2014.

(52) U.S. Cl.
CPC ...... *G01V 1/3843* (2013.01); *G01V 2001/207* (2013.01); *G01V 2210/144* (2013.01)

(56) References Cited

U.S. PATENT DOCUMENTS

| | | | | |
|---|---|---|---|---|
| 4,175,432 A * | 11/1979 | Gibson | ................ | G01V 1/3826 73/170.33 |
| 4,190,012 A * | 2/1980 | Rispin | ................... | B63B 21/663 114/243 |
| 4,694,435 A * | 9/1987 | Magneville | .......... | G10K 11/006 367/17 |
| 4,958,328 A * | 9/1990 | Stubblefield | ........... | G01V 1/201 181/110 |
| 5,231,252 A * | 7/1993 | Sansone | ................... | G01V 1/16 181/112 |
| 5,452,266 A * | 9/1995 | Carter | ...................... | G01V 1/38 367/153 |
| 5,535,176 A * | 7/1996 | Yang | ....................... | H04B 13/02 367/13 |
| 5,835,450 A * | 11/1998 | Russell | ................ | G01V 1/3808 367/20 |
| 6,088,299 A * | 7/2000 | Erath | ................... | G01V 1/3808 367/123 |
| 6,532,190 B2 * | 3/2003 | Bachrach | ................ | G01V 1/16 367/25 |
| 6,791,901 B1 * | 9/2004 | Robertsson | .............. | G01V 1/20 367/58 |
| 7,184,365 B2 * | 2/2007 | George | ................. | G01V 1/201 367/20 |
| 7,411,863 B2 * | 8/2008 | Toennessen | .......... | H01M 4/926 367/20 |
| 7,737,698 B2 * | 6/2010 | Tenghamn | ............. | G01V 3/083 324/347 |
| 7,999,552 B2 * | 8/2011 | Babour | .................. | G01V 3/083 324/365 |
| 8,104,346 B2 | 1/2012 | Paulson | | |
| 8,183,868 B2 * | 5/2012 | Summerfield | ......... | G01V 3/083 324/334 |
| 8,477,561 B2 * | 7/2013 | Singh | ..................... | G01V 1/201 367/20 |
| 8,593,904 B2 * | 11/2013 | Soubaras | ............. | G01V 1/3826 367/16 |
| 9,013,952 B2 * | 4/2015 | Muyzert | .............. | G01V 1/3808 367/15 |
| 9,019,796 B2 * | 4/2015 | Guevel | .................... | G01V 1/38 367/20 |
| 9,638,816 B2 * | 5/2017 | Rentsch-Smith | ...... | G01V 1/364 |
| 9,638,829 B2 * | 5/2017 | Davoodi | .............. | G01V 11/002 |
| 9,671,511 B2 * | 6/2017 | Winnett | .................... | G01V 1/28 |
| 9,864,081 B2 * | 1/2018 | Norris | ..................... | G01V 1/201 |
| 10,191,170 B2 * | 1/2019 | Muijzert | .............. | G01V 1/3817 |
| 10,620,329 B2 * | 4/2020 | Herrmann | ............ | G01V 1/3852 |
| 10,809,403 B2 * | 10/2020 | Moldoveanu | .......... | B63B 35/00 |
| 2003/0105592 A1 * | 6/2003 | Fokkema | ............... | G01V 1/364 702/17 |
| 2006/0239117 A1 | 10/2006 | Singh et al. | | |
| 2007/0056794 A1 | 3/2007 | Cox et al. | | |
| 2007/0223306 A1 | 9/2007 | Toennessen | | |
| 2009/0147619 A1 | 6/2009 | Welker | | |
| 2009/0279387 A1 * | 11/2009 | Tenghamn | ........... | G01V 1/3808 367/21 |
| 2009/0279388 A1 | 11/2009 | Monk et al. | | |
| 2010/0074049 A1 * | 3/2010 | Kragh | .................. | G01V 1/3808 367/16 |
| 2010/0238762 A1 | 9/2010 | Hornbostel | | |
| 2010/0302900 A1 | 12/2010 | Tenghamn | | |
| 2011/0283797 A1 | 11/2011 | Manin | | |
| 2012/0069702 A1 | 3/2012 | Muyzert et al. | | |
| 2012/0081994 A1 * | 4/2012 | Husom | ................... | G01V 1/201 367/16 |
| 2012/0082001 A1 | 4/2012 | Welker et al. | | |
| 2012/0113746 A1 | 5/2012 | Sudow et al. | | |
| 2013/0000218 A1 | 1/2013 | Husom et al. | | |
| 2013/0021872 A1 * | 1/2013 | Husom | ................ | G01V 1/3817 367/16 |
| 2013/0294195 A1 | 11/2013 | Singh | | |
| 2013/0308421 A1 | 11/2013 | Thompson et al. | | |

OTHER PUBLICATIONS

International Preliminary Report on Patentability issued in the related PCT application PCT/US2015/01308, dated Aug. 2, 2016 (13 pages).
Office Action for the equivalent Chinese patent application 201580005990.0 dated May 26, 2017 (English translation is not available).
Partial Search Report for the equivalent European patent application 15740880.8 dated Aug. 9, 2017.
Moldoveanu, N., 2011, Attenuation of the high energy marine towed-streamer noise, SEG Technical Pogram, Expanded Abstracts, 3576-3580.
Ali Özbek, Massimiliano Vassallo, Kemal Özdemir, Dirk-Jan van Manen, Kurt Eggenberger,—Crossline wavefield reconstruction from multicomponent streamer data: Part 2—Joint interpolation and 3D up/down separation by generalized matching pursuit—GEOPHYSICS Nov. 2010, vol. 75, No. 6, pp. WB69-WB85.
International Search Report and Written Opinion issued in the international application PCT/US2015/013038, dated May 6, 2015, 14 pages.
Office Action for the equivalent Chinese patent application 201580005990.0 dated Mar. 27, 2018.
E.J.W. Jones, 1999, Marine Geophysics, pp. 138-140.
Office Action for the equivalent CN application 201580005990.0, dated Nov. 26, 2018 (20 pages).
Zhu et al., Exploration Seismology Course, WUHAN University Press, pp. 202-203, Dec. 31, 2005.
John A. Ward, Value of Vertical Cable Earthquake, Excerpted by Biming Huang, Translations collection of Geophysical Prospecting for Petroleum, No. 5, pp. 81-85, Oct. 31, 1998.
Decision of Rejection received in the related CN Application 201580005990.0, dated Aug. 2, 2019 (15 pages).
Examination Report issued in the related AU Application 2015208997, dated Sep. 17, 2019 (4 pages).
Saudi Arabia Substantive Examination Report; SA Application No. 516371547.
Brazilian Search Report; Application No. BR112016017425-9, dated Jul. 10, 2020.
First Office action in ID Application P00201605712, dated Jun. 12, 2020 (4 pages).
Second Office action in ID Application P00201605712, dated Sep. 24, 2020 (4 pages).
Examination Report in CA Application 2935752, dated Mar. 18, 2021 (4 pages).

\* cited by examiner

MULTI-DIMENSIONAL SEISMIC SENSOR ARRAY

RELATED APPLICATIONS

The present application claims priority to U.S. Patent Application No. 61/932,066 that was filed on Jan. 27, 2014, U.S. Patent No. 62/021,422 that was filed in Jul. 7, 2014, and U.S. Patent Application No. 62/013,482 that was filed on Jun. 17, 2014, both of which are hereby incorporated by reference in their entirety.

TECHNICAL FIELD

The present application relates to marine seismic surveys and multi-dimensional sensor arrays.

BACKGROUND

The following descriptions and examples do not constitute an admission as prior art by virtue of their inclusion within this section.

Seismic exploration involves surveying subterranean geological formations for hydrocarbon deposits. A seismic survey may involve deploying seismic source(s) and seismic sensors at predetermined locations. The sources generate seismic waves, which propagate into the geological formations creating pressure changes and vibrations along their way. Changes in elastic properties of the geological formation scatter the seismic waves, changing their direction of propagation and other properties. Part of the energy emitted by the sources reaches the seismic sensors. Some seismic sensors are sensitive to pressure changes (hydrophones), others to particle motion (e.g., geophones, accelerometers), and industrial surveys may deploy one type of sensors or both. In response to the detected seismic events, the sensors generate electrical signals to produce seismic data. Analysis of the seismic data can then indicate the presence or absence of probable locations of hydrocarbon deposits.

Some surveys include long streamers (e.g., as long as 8 kilometers or more), and may have eight or more streamers towed adjacent to one another. Vessels that tow those streamers are generally large and 100 foot long or more and have a substantial crew. With large vessels of this character, entanglement or other negative interaction with obstacles may be problematic, and can in some cases prevent surveys from being performed in certain areas. Also, cost of operation can be relevant.

Accordingly, the present application relates to smaller vessels that can provide certain advantages over those performed by large vessels both in cost of operation and performance.

Thus, the present application relates to a number of combinations of embodied features relating to unmanned vessels and sensors related thereto.

The preceding description is meant to help the understanding of one skilled in the art and is not meant in any way to unduly limit the scope of any present or subsequent related claims of the present application.

SUMMARY

The following is a description of various combinations of embodied features and is meant in no way to unduly limit any present or future related claim in the present or subsequent related applications.

According to various combination of embodied features, a system can include an unmanned marine vessel having a hull; a multi-dimensional seismic sensor array coupled with the hull, wherein the multi-dimensional seismic sensor array is configured to acquire seismic survey data in multiple directions; wherein the unmanned marine vessel comprises a power source configured to drive and provide propulsion to the unmanned marine vessel; and an umbilical cord for coupling the multi-dimensional seismic sensor array with the hull of the unmanned marine vessel, wherein the umbilical provides electrical communication between the unmanned marine vessel and the multi-dimensional seismic sensor array.

According to various combination of embodied features, a device includes a multi-dimensional seismic sensor array configured for coupling with an unmanned marine vessel and configured for floating beneath the unmanned marine vessel at a pre-determined depth, the multi-dimensional seismic sensor array configured to acquire seismic survey data in multiple directions, the multi-dimensional seismic sensor array having at least three seismic streamers arranged in a triangular prism shape.

According to various combination of embodied features, the a method of performing a seismic survey, includes locating in water an unmanned seismic survey vessel having coupled thereto a multidimensional sensor array comprising at least three parallel streamers; activating a seismic source and detecting reverberations of that source with the sensor array and recording resulting data.

The above referenced summary section is provided to introduce a selection of concepts in a simplified form that is further described in the detailed description section herein below.

The summary is not intended to identify key features or essential features of claimed subject matter, nor is it intended to be used to limit the scope of the claimed subject matter. The claimed subject matter is not limited to implementations that solve any or all disadvantages noted in any part of this disclosure.

BRIEF DESCRIPTION OF THE DRAWINGS

Implementations of various techniques will hereafter be described with reference to the accompanying drawings. It should be understood, however, that the accompanying drawings illustrate only the various implementations described herein and are not meant to limit the scope of various techniques described herein.

DETAILED DESCRIPTION

The discussion below is directed to certain implementations. It is to be understood that the discussion below is only for the purpose of enabling a person with ordinary skill in the art to make and use any subject matter defined now or later by the patent "claims" found in any issued patent herein.

It is specifically intended that the claimed combinations of features not be limited to the implementations and illustrations contained herein, but include modified forms of those implementations including portions of the implementations and combinations of elements of different implementations as come within the scope of the following claims. It should be appreciated that in the development of any such actual implementation, as in any engineering or design project, numerous implementation-specific decisions must be made to achieve the developers' specific goals, such as compliance with system-related and business related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure. Nothing in this application is considered critical or essential to the claimed invention unless explicitly indicated as being "critical" or "essential."

It will also be understood that, although the terms first, second, etc. may be used herein to describe various elements, these elements should not be limited by these terms. These terms are only used to distinguish one element from another. For example, a first object or step could be termed a second object or step, and, similarly, a second object or step could be termed a first object or step, without departing from the scope of the invention. The first object or step, and the second object or step, are both objects or steps, respectively, but they are not to be considered a same object or step.

The following paragraphs provide various techniques for acquiring seismic survey data using a multi-dimensional seismic sensor array coupled to an unmanned marine vessel, vehicle, device, etc., which will now be described in more detail with reference to FIGS. 1-5.

Marine surveys may be performed in various marine environments. In a marine survey, unmanned marine vessels, such as autonomously operated vehicles (AOVs) or remotely operated vehicles (ROVs), may be used to gather seismic data from one or more seismic sensors. These seismic sensors may be attached to vertical seismic streamers deployed from the unmanned marine vessels, which may allow for more effective removal of ghost signals and measurement of propagation speed when compared with more conventional horizontal streamers towed by larger vessels.

Figure 1A:
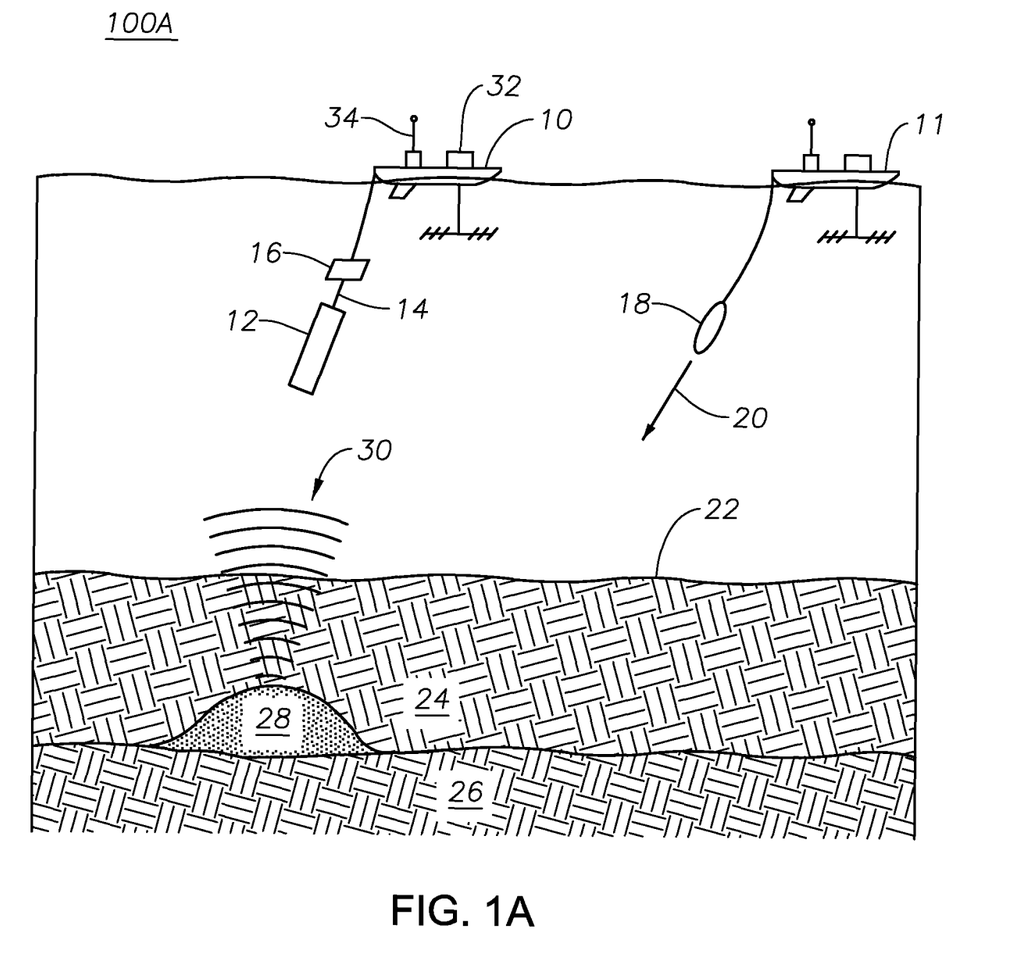
FIGS. 1A-1B illustrate diagrams of systems for acquiring seismic survey data using a multi-dimensional seismic sensor array coupled to an unmanned marine vessel in accordance with implementations of various techniques described herein.
Figure 1B:
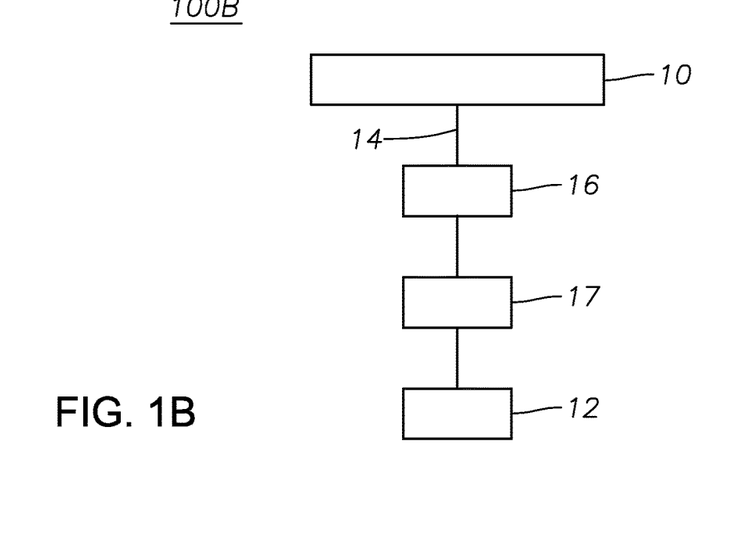

FIGS. 1A-1B illustrate various schematic diagrams of systems 100A, 100B for acquiring seismic survey data in accordance with implementations of techniques described herein. In particular, FIG. 1A illustrates a diagram of a system 100A for acquiring seismic survey data using a multi-dimensional seismic sensor array 12 coupled to an unmanned marine vessel 10, and FIG. 1B illustrates another diagram of a system 100B for coupling the multi-dimensional seismic sensor array 12 to the unmanned marine vessel 10 with a force decoupling mechanism 17, in accordance with implementations of various techniques described herein.

The system 100 may include at least one unmanned marine vessel 10 that may be adapted to descend through a water column or may be adapted for movement on a sea surface via a thrust or propulsion mechanism. The unmanned marine vessel 10 may include an autonomously operating vehicle (AOV) or a remotely operating vehicle (ROV) maneuvering on the sea surface, such as a wave glider or a hybrid water vehicle. In some examples, the wave glider may be configured to harness wave energy to impart motion to the wave glider. In some examples, the hybrid water vehicle may be configured to combine mechanical propulsion methods with energy harvesting principles, such as the energy harvesting principles used by wave gliders. In some examples, the unmanned marine vessel 10 may take the form of one or more other types of marine vessels, such as a diving wave glider, a submarine unmanned marine vessel, a sail buoy, or any other implementation known to those skilled in the art.

The unmanned marine vessel 10 may be used for seismic surveying and may include a multi-dimensional seismic sensor array 12. In various implementations, the term multi-dimensional may refer to two-dimensional (2D), three-dimensional (3D), or more than three dimensional, depending on specific implementations. Further, in some implementations, the multi-dimensional seismic sensor array 12 may be referred to as a seismic sensor package having multiple seismic sensors as described herein.

In reference to FIG. 1A, the multi-dimensional seismic sensor array 12 may be disposed on a streamer 14 coupled to the unmanned marine vessel 10. The streamer 14 may descend in a generally vertical direction from the unmanned marine vessel 10 into a water column. In one implementation, the streamer 14 may descend to a depth below the sea surface. For example, the streamer 14 may descend 10 meters or greater below the sea surface.

In various implementations, the multi-dimensional seismic sensor array 12 may be coupled to a hull of the unmanned marine vessel 10 via an umbilical cord or a streamer 14. The multi-dimensional seismic sensor array 12 may be configured to acquire seismic survey data and calculate pressure gradients in multiple directions. In some examples, the multiple directions may include horizontal and vertical directions. In some other examples, the multiple directions may include any or all of x-coordinate, y-coordinate, and z-coordinate directions.

The multi-dimensional seismic sensor array 12 may include various sensor including pressure sensors, particle motion sensors, and/or multi-component seismic sensors. For example, in reference to multi-component seismic sensors, the multi-dimensional seismic sensor array 12 may be configured to detect a pressure wavefield and at least one component of a particle motion that is associated with acoustic signals that may be proximate to the multi-component seismic sensor. Further, examples of particle motion sensors include one or more components of a particle displacement, one or more components (inline (x), crossline (y) and vertical (z) components) of a particle velocity and one or more components of a particle acceleration.

In various implementations, the multi-component seismic sensors may include one or more geophones, hydrophones, inclinometers, particle displacement sensors, optical sensors, particle velocity sensors, accelerometers, pressure gradient sensors, or combinations thereof. According to some embodiments, a particular multi-component seismic sensor may include three orthogonally-aligned accelerometers (e.g., three-component micro-electro-mechanical system (MEMS) accelerometer) to measure three corresponding orthogonal components of particle velocity and/or acceleration near the seismic sensor. According to some embodiments, the MEMS-based accelerometer may be a capacitive MEMS-based sensor of the type described in commonly assigned co-pending U.S. patent application Ser. No.

12/268,064, which is incorporated herein by reference. In some implementations, one or more hydrophones configured for measuring pressure may be used in combination with the three-component MEMS described herein.

The multi-component seismic sensor may be implemented as a single device or as a plurality of devices. A particular multi-component seismic sensor may also include pressure gradient sensors, which constitute another type of particle motion sensors. Each pressure gradient sensor measures the change in the pressure wavefield at a particular point with respect to a particular direction. For example, one of the pressure gradient sensors may acquire seismic data indicative of, at a particular point, the partial derivative of the pressure wavefield with respect to the crossline direction, and another one of the pressure gradient sensors may acquire, at a particular point, seismic data indicative of the pressure data with respect to the inline direction.

The unmanned marine vessel 10 may be deployed to a survey area for seismic surveying. Where the unmanned marine vessel 10 takes the form of an AOV, the unmanned marine vessel 10 may be deployed to a survey area specified on a navigation map. The unmanned marine vessel 10 may automatically make corrections, if the unmanned marine vessel 10 veers off-course. Where the unmanned marine vessel 10 takes the form of a ROV, the unmanned marine vessel 10 may be deployed to a survey area using remote operation of the unmanned marine vessel's rudder and/or thrust mechanism.

After deploying the unmanned marine vessel 10 to the survey area, a seismic source 18 may be activated to generate acoustic waves 20 that propagate through an ocean bottom surface 22 and into strata 24, 26 beneath the ocean bottom surface. The seismic source 18 may be located on another unmanned marine vessel 11, as shown in FIG. 1A, or more conventional source deployments may be used, such as the use of dedicated source vessels. The seismic source 18 may be a conventional air gun, marine vibrator, or non-traditional environmentally friendly source. The seismic source may also include drilling induced acoustic pressure waves, passive seismic noise, or production induced acoustic pressure waves, such as those which may result from water or gas injections, or combinations thereof.

Acoustic signals 20 may be reflected from various subterranean geological formations, such as formation 28 depicted in FIG. 1A. The incident acoustic signals 20 produce corresponding reflected acoustic signals, or pressure waves 30, which are sensed by the multi-dimensional seismic sensor array 12. The unmanned marine vessel 10 may record seismic data from over one hundred seismic sensors.

The multi-dimensional seismic sensor array 12 may generate signals called "traces," which indicate the acquired measurements of the pressure wavefield and particle motion if the sensors include particle motion sensors. The traces are recorded and may be passed to a data acquisition system 32 disposed on the unmanned marine vessel 10. The data acquisition system 32 may include a digitizer, a computer system, and a storage system for storing seismic data acquired during the survey. The storage system may include memory, such as a hard disk drive. In one implementation, the seismic data may be recorded continuously over days or months at a time. In another implementation, the seismic data may be recorded intermittently, such as after each detonation of the seismic source 18.

The unmanned marine vessel 10 may include an onboard communication unit 34, which may communicate with a base station located onshore or at sea, such as on a rig or vessel. The communication unit 34 may be used to transmit data and information associated with the unmanned marine vessel 10, including position, quality control parameters, time information, and seismic data. The communication unit 34 may send or receive commands particular to the seismic survey. The unmanned marine vessel 10 may include a power source (e.g., batteries, motor, propeller, etc.) configured to drive and provide propulsion to the unmanned marine vessel 10. In some examples, the unmanned marine vessel 10 may be powered by batteries, which may be recharged by solar panels disposed on the top of the unmanned marine vessel 10.

As mentioned previously and as illustrated in FIG. 1A, the streamer 14 may descend in a generally vertical direction from the unmanned marine vessel 10 into the water column. The length of the streamer 14 may vary from less than one meter to over one kilometer. In some examples, a sub component 16 may be disposed between the umbilical cord or streamer 14 and the multi-dimensional seismic sensor array 12. The sub component 16 may be configured to provide electrical communication between the unmanned marine vessel 10 and the multi-dimensional seismic sensor array 12. In some examples, the sub component 16 may be employed as a fairing to reduce cross-flow noise due to currents and drag forces. Further, in some examples, accelerometers (not shown) capable of measuring a gravity vector may be used to measure a tilt of the streamer 14 relative to the vertical.

In reference to FIG. 1B, the system 100B may be referred to as an assembly or an ensemble of the unmanned marine vessel 10 including a wave glider float, the umbilical cord 14, the sub component 16, the force decoupling mechanism 17, and the multi-dimensional seismic sensor array 12. In some implementations, the force decoupling mechanism 17 may be used to couple the multi-dimensional seismic sensor array 12 to the unmanned marine vessel 10. As shown in FIG. 1B, the force decoupling mechanism 17 may be disposed between the sub component 16 and the multi-dimensional seismic sensor array 12.

In some implementations, the umbilical cord 14 may be thinner than conventional towed streamers and may be configured for facilitating ease of handling by the unmanned marine vessel 10. For example, the umbilical cord 14 may have a diameter of one half of one inch. Further, the umbilical cord 14 may be formed of fiber optic cables and/or cables with fiber optic sensors may be used, thus resulting in a lighter and thinner streamer relative to conventional towed streamers.

Figure 2:
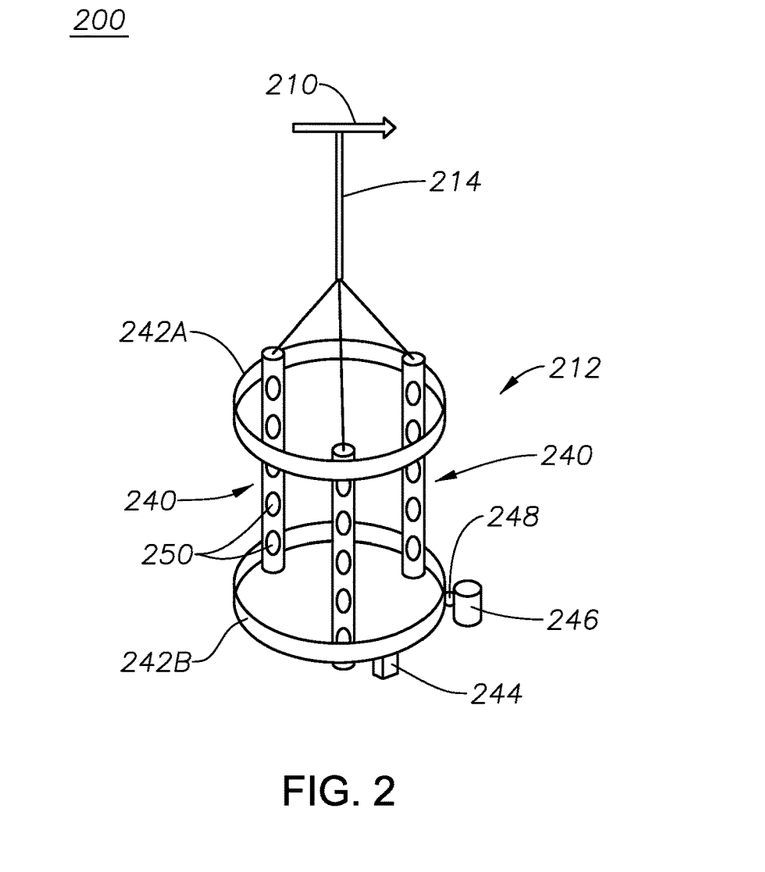
FIG. 2 illustrates a diagram of a system for acquiring seismic survey data using a multi-dimensional seismic sensor array coupled to an unmanned marine vessel in accordance with implementations of various techniques described herein.

FIG. 2 illustrates a diagram of a system 200 for acquiring seismic survey data using a multi-dimensional seismic sensor array 212 coupled to an unmanned marine vessel 210 in accordance with implementations of various techniques described herein. As described herein, the multi-dimensional seismic sensor array 212 may be coupled to a hull of the unmanned marine vessel 210 (e.g., a wave glider float) via an umbilical cord 214, and the seismic sensor array 212 may be configured to acquire seismic survey data and calculate pressure gradients in multiple directions. Further, the multi-dimensional seismic sensor array 212 may be configured to float beneath the unmanned marine vessel 210 at a predetermined depth.

In reference to FIG. 2, the multi-dimensional seismic sensor array 212 may include multiple seismic streamers 240 (e.g., at least three seismic streamers) arranged parallel to one another in a triangular prism shape that can be positioned vertically. In some examples, the seismic streamers 240 may be coupled together with multiple collars including a first collar 242A coupled to a first end of the seismic streamers and a second collar 242B coupled to a second end of the seismic streamers that is opposite the first end. In some examples, a buoyancy of the multiple collars 242A, 242B may be configured to maintain the multi-dimensional seismic sensor array 212 at a particular depth in a water column. Further, in some examples, the multi-dimensional seismic sensor array 212 may include one or more of an underwater orientation device 244, a small engine thruster 246, and a miniature steering device 248 (e.g., a mini Q-fin™)

The multi-dimensional seismic sensor array 212 may include a plurality of seismic sensors 250 arranged in a multi-dimensional geometric configuration. In some examples, the seismic sensors 250 deployed in the streamers 240 may include one or more of hydrophones, MEMS accelerometers, geophones, and the like. The number of seismic sensors 250 and a separation of the seismic sensors coupled to the streamers 240 may be determined as a function of signal-to-noise (SNR) requirements and the capability to perform separation of an upgoing seismicwave-field from a downgoing seismic wavefiled (receiver deghosting).

In some implementations, if multiple hydrophone components refer to $u_i, v_i, z_i$, which may correspond to first, second, and third streamers, respectively, the pressure gradient may be calculated in a vertical direction. For example:

$u_i - u_{i+1}$
$v_i - v_{i+1}$ i=1,n where n=number of sensors in each cable
$Z_i - z_{i+1}$ Similarly, the gradients may be calculated in three horizontal directions:

$u_i - v_i$
$v_i - z_i$ i=1,n where n=number of sensors in each cable
$z_i - u_i$ In some implementations, MEMS accelerometers may be used to measure water particle acceleration and gravity, where various gravity measurements may be used to determine sensor orientation. Further, since the pressure gradient may be derived from acceleration, a dual pressure gradient may be available to perform separation of upgoing and downgoing seismic fields.

Further, hydrophone measurements and MEMS acceleration measurements may be used to perform 2D deghosting and simultaneously 3D deghosting along with wavefield reconstruction, if the spatial separation of the arrays is adequate. The three dimensional sensor array may offer a possibility to attenuate seismic noise efficiently by applying a sequence of noise attenuation followed by 3D digital group forming. The output from a 3D dimensional seismic sensor array after digital group forming and 3D wavefield separation may include upgoing pressure at a location of the seismic sensor array determined at a time when the seismic source was actuated.

In some implementations, the multi-dimensional seismic sensor array 212 may include at least three vertical streamers 240 having a length of 1 m to 4 m and separated by 0.5 m or thereabout, e.g., substantially 0.5 m. The streamers 240 may be coupled together to form a triangular prism with use of two collars 242A, 242B (or rings). A composition of the collars may include a material having a density of less than (or substantially less than) 1 g/cm$^3$ for floating in water. The number of collars may be more than two depending on the weight of the three vertical streamers and other devices that may be added, like the underwater orientation device 244 and the one or more thrusters 246. A calculation of buoyancy may be determined in such a way that the multi-dimensional sensor array 212 maintains a desired deployment depth in water.

In some implementations, the deployment depth of the multi-dimensional seismic sensor array 212 may be below 10 meters (m) from the water surface, such as, for example, a deployment depth of 15 m to 20 m or greater. Further, attached to the multi-dimensional seismic sensor array 212 may be the underwater orientation device 244, one or more small engines or thrusters 246, and/or one or more streamer steering devices 248 (e.g., mini Q-fins™ available commercially from WesternGeco) to assist with controlling the verticality of the multi-dimensional seismic sensor array 212 and to hold the multi-dimensional seismic sensor array 212 at the desired station, if the unmanned marine vessel 210 is configured to hold station. The thrusters 246 may assist with moving the multi-dimensional seismic sensor array 212 to a new station. An alternative to using the thruster 246 is using the steering devices 248, wherein the steering devices 248 may be used to steer the streamers 240 in towed-streamer marine data acquisition.

Figure 3:
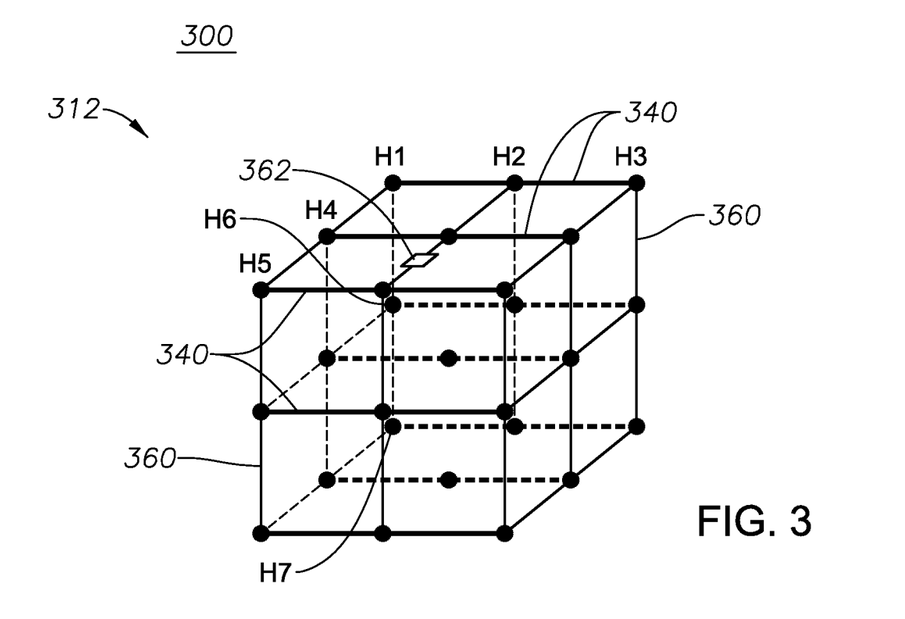
FIGS. 3-4 illustrate various diagrams of devices for acquiring seismic survey data using a multi-dimensional seismic sensor array coupled to an unmanned marine vessel in accordance with implementations of various techniques described herein.

FIG. 3 illustrates a diagram of a device 300 for acquiring seismic survey data using a multi-dimensional seismic sensor array 312 coupled to an unmanned marine vessel (e.g., the unmanned marine vessel 10 of FIG. 1A) in accordance with implementations of various techniques described herein. The multi-dimensional seismic sensor array 312 may be coupled with a hull of the unmanned marine vessel (e.g., a wave glider float) via an umbilical cord, and the seismic sensor array 312 may be configured to acquire seismic survey data and calculate pressure gradients in multiple directions. Further, the multi-dimensional seismic sensor array 312 may be configured to float beneath an unmanned marine vessel at a pre-determined deployment depth in a water column.

In one implementation, the multi-dimensional seismic sensor array 312 may include multiple seismic streamers 340 (e.g., at least nine seismic streamers) arranged in a multi-dimensional geometric structure, e.g., a cuboid type lattice structure having three planar levels of three seismic streamers spaced apart at similar spatial intervals. In this embodiment, 3 seismic streamers×3 rows of seismic streamers=9 seismic streamers. In some implementations, the multi-dimensional seismic sensor array 312 may include a frame 360 with multiple seismic streamers 340 (e.g., at least nine seismic streamers) arranged in a multi-dimensional geometric structure (e.g., a cuboid) at pre-determined spatial intervals. As shown, the seismic streamers 340 may be spaced apart at pre-determined spatial intervals, which may be similar, different, or random spatial intervals. I should be understood that the streamers can deviate from a straight configuration, and can have certain curved characteristics or portions. According to embodiments, fewer than nine seismic streamers can be connected to form a cube or rectangular shaped array. Four seismic streamers can be connected to form a cube or rectangular shaped array.

In some implementations, the multi-dimensional seismic sensor array 312 may be arranged in a multi-dimensional geometric structure, which may define a cuboid type lattice structure having four open side faces and two open end faces. The cuboid type lattice structure may include at least one seismic streamer coupled at each lateral edge where the four open side faces intersect, thus forming the four seismic streamers. The cuboid type lattice structure may further include at least one seismic streamer positioned between each lateral edge of the four open side faces, thus forming an additional four seismic streamers. The cuboid type lattice structure may further include at least one seismic streamer positioned within the cuboid type lattice structure, such as in a central region of the cuboid structure, thus forming one additional seismic streamers. In that embodiment, 4 seismic streamers+4 seismic streamers+1 seismic streamer=9 seismic streamers.

In some implementations, the multi-dimensional seismic sensor array 312 may include three seismic streamers arranged in parallel to one another defining a first plane and two seismic streamers arranged in parallel to at least one of the first three seismic streamers and defining a second plane that is substantially perpendicular to the first plane.

In some implementations, the multi-dimensional seismic sensor array 312 may include a plurality of hydrophones H1, H2, . . . , H7 arranged in x-coordinate, y-coordinate, and z-coordinate directions, as shown in FIG. 3. Each seismic streamer may include at least three hydrophones. As such, the multi-dimensional seismic sensor array 312 may include a 3D hydrophone array that can be attached to an unmanned marine vessel (e.g., a wave glider).

In some implementations, the multi-dimensional seismic sensor array 312 may include the 3D hydrophone array that may include 9 short streamers. The dimension of seismic sensor array 312 may be (or substantially be) 1.2 m×1.2 m×1.2 m. These dimensions can be smaller however and still function properly. The multi-dimensional seismic sensor array 312 may include a horizontal streamer separation of (or substantially) 0.6 m and a vertical separation of (or substantially) 0.6 m. The multi-dimensional seismic sensor array 312 may include three hydrophones per streamer and an interval between the hydrophones may be (or substantially be) 0.6 m. According to these various embodiments, the multi-dimensional seismic sensor array 312 may allow for calculating the first and second derivatives of pressure in any or all of x, y, and z directions and detecting the direction of the seismic arrival.

Using various implementations described herein, the pressure gradient and the second derivative of pressure in any or all of x, y, and z directions may be calculated. Various implementations described herein may further allow for performing 3D deghosting and also interpolation of the pressure in x and y directions. Further, the multi-dimensional seismic sensor array 312 may allow for detecting direction of the seismic arrival.

As described herein, a streamer in the multi-dimensional seismic sensor array 312 may be equipped with hydrophones and MEMS accelerometers. From accelerometer measurements, the pressure gradient may be estimated in any or all of x, y, and z directions, and based on these gradient measurements and pressure measurements (hydrophone data), 3D receiver deghosting and interpolation may be performed. Pressure gradient sensors can also be used.

In some implementations, the multi-dimensional seismic sensor array 312 may include a transponder 362. Further, the multi-dimensional seismic sensor array 312 may be equipped with the transponder 362 to allow for accurate positioning. As such, the transponder 362 may be used with a positioning system, such as an Ultra Short Base Line (USBL) positioning system. The USBL may be referred to as a Super Short Baseline (SSBL), and generally, the USBL may be used as an underwater positioning system along with a vessel mounted transceiver to detect range and bearing of a target using acoustic signals.

Figure 4:
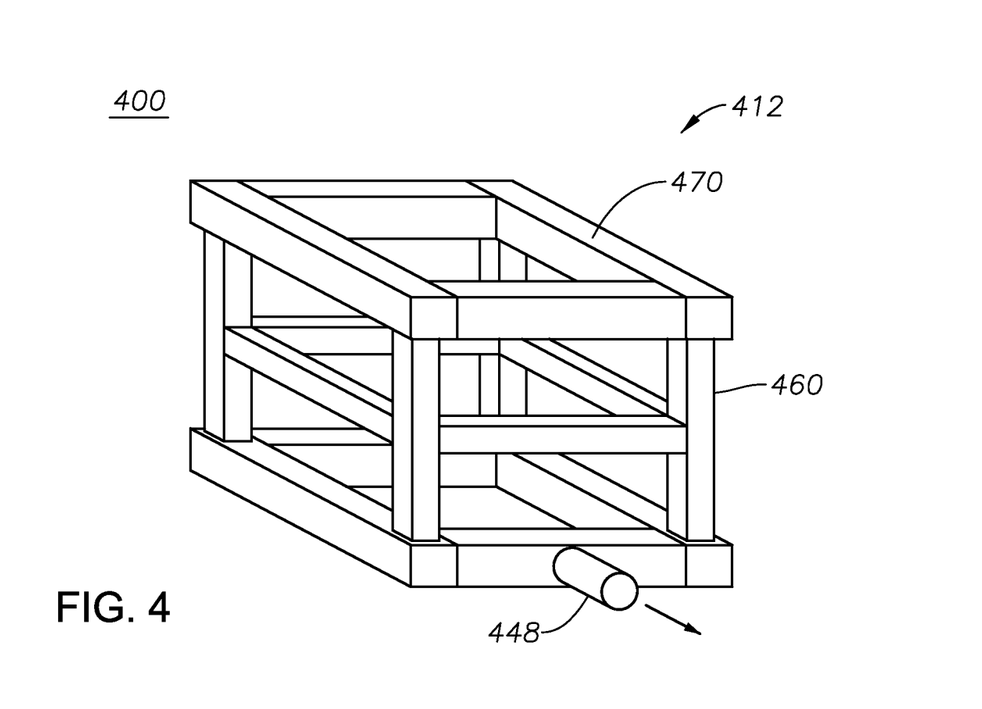

FIG. 4 illustrates a diagram of a device 400 for acquiring seismic survey data using a multi-dimensional seismic sensor array 412 coupled to an unmanned marine vessel (e.g., the unmanned marine vessel 10 of FIG. 1A) in accordance with implementations of various techniques described herein. As described herein, the multi-dimensional seismic sensor array 412 may be coupled to a hull of the unmanned marine vessel (e.g., a wave glider float) via an umbilical cord, and the seismic sensor array 412 may be configured to acquire seismic survey data and calculate pressure gradients in multiple directions. Further, the multi-dimensional seismic sensor array 412 may be configured for floating beneath an unmanned marine vessel at a pre-determined deployment depth in a water column.

In reference to FIG. 4, the multi-dimensional seismic sensor array 412 may include a plurality of shallow water nodes 470 and a frame 460 having members that are arranged to define a multi-dimensional geometric structure, such as, a multi-dimensional cuboid type lattice structure. The frame 460 may be configured to couple the shallow water nodes 470 together in the multi-dimensional geometric structure, shape, or form. The multi-dimensional seismic sensor array 412 may include a steering device 448, or thrusters as described above with reference to FIGS. 2-3.

The multi-dimensional seismic sensor array 412 may include eight shallow water nodes 470. As shown in FIG. 4, a first grouping of four shallow water nodes 470 may be coupled together and positioned at a first end of the multi-dimensional seismic sensor array 412, and a second grouping of four shallow water nodes 470 may be coupled together and positioned at a second end of the multi-dimensional seismic sensor array 412. The first end is opposite the second end.

The multi-dimensional geometric structure 412 may be configured to define an expanded cuboid type lattice structure with three planar levels of members spaced apart at similar pre-determined spatial intervals. As shown, the first grouping of four shallow water nodes 470 may be coupled together to define a rectangular shape, and similarly, the second grouping of four shallow water nodes 470 may be coupled together to define another rectangular shape.

Further, in some implementations, the multi-dimensional geometric structure may be described as a cuboid type lattice structure having four open side faces and two open end faces, including a first open end face and a second open end face. The cuboid type lattice structure may include four shallow water nodes coupled in a rectangular shape at each lateral edge of the first open end face. The cuboid type lattice structure may further include another four shallow water nodes coupled in a rectangular shape at each lateral edge of the second open end face.

As described in reference to FIG. 4, the multi-dimensional seismic sensor array 412 may be constructed and/or manufactured using shallow water nodes 470. In some implementations, each shallow water node 470 may include a hydrophone, three component geophones, and a recording system configured to record continuously for a certain period of time (e.g., 1 month). In some implementations, each of the shallow water nodes 470 may include one or more geophones arranged in a vertical orientation and configured to calculate a second derivative of pressure. Further, a compass device and an inclinometer or MEMS accelerometer may be included with the node and used to determine orientation of the node in a water column. Further, the frame 460 may be constructed and/or manufactured to hold together eight shallow water nodes, as shown in FIG. 4. Further, in some examples, the multi-dimensional sensor array 412 may be coupled or attached to an unmanned marine vessel using a vertical decoupling mechanism (e.g., the vertical force decoupling mechanism 17 of FIG. 1B).

In some embodiments, the dimensions of each node may be (or substantially be): length=521 mm, width=208 mm, and height=108 mm. In some embodiments, the dimensions of the multi-dimensional seismic sensor array 412 may be (or substantially be): 521 mm×521 mm×521 mm.

In operation, the multi-dimensional seismic sensor array 412 may include eight shallow water nodes that may allow for calculating pressure gradients in vertical and horizontal directions. Also, having vertical geophones inside each shallow water node may allow for calculating the second derivative of the pressure.

Figure 5:
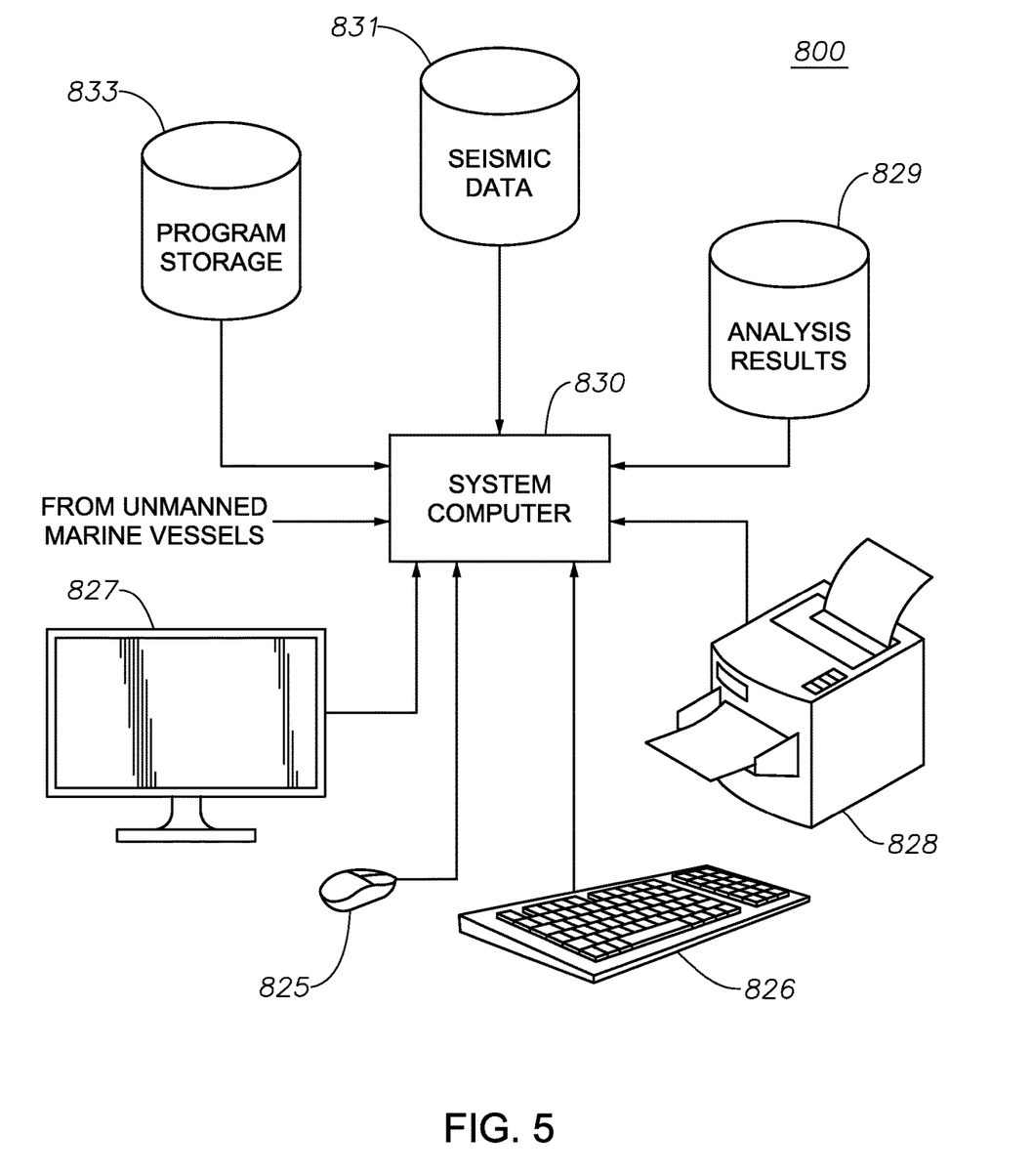
FIG. 5 illustrates a computing system in accordance with implementations of various techniques described herein.

FIG. 5 illustrates a computing system 800 that may be used in connection with various implementations described herein that may be implemented. The computing system 800 (system computer) may include one or more system computers 830, which may be implemented as any conventional computer or server. However, those skilled in the art will appreciate that implementations of various techniques described herein may be practiced in other computer system configurations, including hypertext transfer protocol (HTTP) servers, hand-held devices, multiprocessor systems, microprocessor-based or programmable consumer electronics, network PCs, minicomputers, mainframe computers, and the like.

The system computer 830 may be in communication with disk storage devices 829, 831, and 833, which may be external hard disk storage devices. It is contemplated that disk storage devices 829, 831, and 833 are conventional hard disk drives, and as such, will be implemented by way of a local area network or by remote access. Of course, while disk storage devices 829, 831, and 833 are illustrated as separate devices, a single disk storage device may be used to store any and all of the program instructions, measurement data, and results as desired.

In some implementations, seismic data from the sensors may be stored in disk storage device 831. The system computer 830 may retrieve the appropriate data from the disk storage device 831 to process seismic data according to program instructions that correspond to implementations of various techniques described herein. The program instructions may be written in a computer programming language, such as C++, Java and the like. The program instructions may be stored in a computer-readable medium, such as program disk storage device 833. Such computer-readable media may include computer storage media and communication media. Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the system computer 830. Communication media may embody computer readable instructions, data structures or other program modules. By way of example, and not limitation, communication media may include wired media such as a wired network or direct-wired connection, and wireless media such as acoustic, radio frequency (RF), infrared (IR), and various other wireless media. Further, combinations of any of the above may also be included within the scope of computer readable media.

In some implementations, the system computer 830 may provide output primarily onto graphics display 827, or alternatively via printer 828. The system computer 830 may store the results of the methods described above on disk storage 829, for later use and further analysis. Further, the keyboard 826 and/or the pointing device 825 (e.g., a mouse, trackball, or the like) may be provided with the system computer 830 to enable interactive operation.

The system computer 830 may be located at a data center remote from the survey region. The system computer 830 may be in communication with the receivers (either directly or via a recording unit, not shown), to receive signals indicative of the reflected seismic energy. These signals, after conventional formatting and other initial processing, may be stored by the system computer 830 as digital data in the disk storage 831 for subsequent retrieval and processing in the manner described above. In one implementation, these signals and data may be sent to the system computer 830 directly from sensors, such as geophones, hydrophones, and the like.

When receiving data directly from the sensors, the system computer 830 may be described as part of an in-field data processing system. In another implementation, the system computer 830 may process seismic data already stored in the disk storage 831. When processing data stored in the disk storage 831, the system computer 830 may be described as part of a remote data processing center, separate from data acquisition. The system computer 830 may be configured to process data as part of the in-field data processing system, the remote data processing system or a combination thereof.

While FIG. 5 illustrates the disk storage 831 as directly connected to the system computer 830, it is also contemplated that the disk storage device 831 may be accessible through a local area network or by remote access. Further, while disk storage devices 829, 831 are illustrated as separate devices for storing input seismic data and analysis results, the disk storage devices 829, 831 may be implemented within a single disk drive (either together with or separately from program disk storage device 833), or in any other conventional manner as will be fully understood by one of skill in the art having reference to this specification.

While the foregoing is directed to implementations of various techniques described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system, comprising:
    an unmanned marine vessel having a hull;
    a multi-dimensional seismic sensor array comprising a plurality of seismic sensors arranged in three dimensions in a triangle prism shape along only three streamers, wherein the only three streamers are coupled to at least one support, wherein the plurality of seismic sensors is configured to acquire seismic survey data in multiple directions;
    wherein the unmanned marine vessel comprises a power source configured to drive and provide propulsion to the unmanned marine vessel;
    an umbilical cord configured to couple the multi-dimensional seismic sensor array with the hull of the unmanned marine vessel, wherein the umbilical cord provides electrical communication between the unmanned marine vessel and the multi-dimensional seismic sensor array; and
- a force decoupler disposed between a sub component and the multi-dimensional seismic sensor array, wherein the force decoupler is configured to couple the multi-dimensional seismic sensor array to the unmanned marine vessel, wherein the sub component is configured to provide electrical communication between the unmanned marine vessel and the multi-dimensional seismic sensor array, wherein the force decoupler, the sub component, and the multi-dimensional seismic sensor array are disposed in a vertical configuration, wherein the sub component is separate from all of the plurality of seismic sensors, wherein the sub component includes at least one of a fairing or a component configured to provide electrical communication between the unmanned marine vessel and the multi-dimensional seismic sensor array.

2. The system of claim 1, wherein the plurality of seismic sensors are selected from a group consisting of one or more hydrophones, one or more micro-electro-mechanical sensor (MEMS) accelerometers, one or more geophones and one or more inclinometers.

3. The system of claim 1, wherein the multiple directions comprise horizontal and vertical directions.

4. The system of claim 1, wherein the multiple directions comprise x-coordinate, y-coordinate, and z-coordinate directions.

5. The system of claim 1, wherein the only three seismic streamers are arranged parallel to one another in the triangular prism shape, wherein the umbilical cord is positioned above the only three seismic streamers.

6. A method of performing a seismic survey, comprising:
- locating in water an unmanned marine vessel having coupled thereto a multi-dimensional sensor array comprising a plurality of seismic sensors arranged in three dimensions in a triangle prism shape along only three streamers, wherein the only three streamers are coupled to at least one support;
- disposing a force decoupler between a sub component and the multi-dimensional seismic sensor array, wherein the force decoupler is configured to couple the multi-dimensional seismic sensor array to the unmanned marine vessel, wherein the sub component is configured to provide electrical communication between the unmanned marine vessel and the multi-dimensional seismic sensor array, wherein the force decoupler, the sub component, and the multi-dimensional seismic sensor array are disposed in a vertical configuration, wherein the sub component is separate from all of the plurality of seismic sensors, wherein the sub component includes at least one of a fairing or a component configured to provide electrical communication between the unmanned marine vessel and the multi-dimensional seismic sensor array, wherein the force decoupler, the sub component, and the multi-dimensional seismic sensor array are directly coupled at different respective locations along an umbilical cord; and
- activating a seismic source and detecting reverberations of that source with the multi-dimensional sensor array and recording resulting data.

7. The method of claim 6, wherein the only three seismic streamers are arranged parallel to one another in the triangular prism shape, wherein the umbilical cord is positioned above the only three seismic streamers.

8. A system, comprising:
- a multi-dimensional seismic sensor array configured to couple with a marine vessel, wherein the multi-dimensional seismic sensor array comprises a plurality of seismic sensors arranged in three dimensions in a triangle prism shape along only three streamers, wherein the only three streamers are coupled to at least one support, wherein the plurality of seismic sensors is configured to acquire seismic survey data in multiple directions; and
- a force decoupler disposed between a sub component and the multi-dimensional seismic sensor array, wherein the force decoupler is configured to couple the multi-dimensional seismic sensor array to the marine vessel, wherein the sub component is configured to provide electrical communication between the marine vessel and the multi-dimensional seismic sensor array, wherein the force decoupler, the sub component, and the multi-dimensional seismic sensor array are disposed in a vertical configuration, wherein the sub component is separate from all of the plurality of seismic sensors.

9. The system of claim 8, wherein the sub component includes a fairing having one or more electronics configured to provide electrical communication between the marine vessel and the multi-dimensional seismic sensor array.

10. The system of claim 8, comprising an umbilical cord configured to couple the multi-dimensional seismic sensor array with the marine vessel, wherein the umbilical cord provides electrical communication between the marine vessel and the multi-dimensional seismic sensor array, wherein the force decoupler, the sub component, and the multi-dimensional seismic sensor array are directly coupled at different respective locations along the umbilical cord.

11. The system of claim 8, wherein the sub component is vertically above all of the plurality of seismic sensors.

12. The system of claim 8, wherein the at least one support comprises a plurality of collars, and the only three streamers are coupled together with the plurality of collars at different axial positions along the only three streamers.

13. The system of claim 12, wherein one or more of the plurality of collars has a buoyancy configured to maintain the multi-dimensional seismic sensor array at a particular depth in a water column.

14. The system of claim 12, wherein the plurality of collars comprises annular collars.

15. The system of claim 12, comprising an underwater orientation device, an engine thruster, and a steering device coupled to the plurality of collars.

16. The system of claim 8, wherein each streamer of the only three streamers has at least three of the plurality of seismic sensors.

17. The system of claim 16, wherein each streamer of the only three streamers has a length of 1 to 4 meters.

* * * * *